Patented June 26, 1934

1,964,161

UNITED STATES PATENT OFFICE 1,964,161

METHOD OF TREATING BRINE CONTAINING SOLUBLE SILICA

Walter A. Kuhnert, Los Angeles, Calif.

No Drawing. Application February 11, 1929,
Serial No. 339,276

4 Claims. (Cl. 23—38)

This invention relates to the treatment of brines containing soluble silica, and particularly to natural alkali bearing brines, such as the brine from Owens Lake, California. It includes, as an essential feature, a novel means of precipitating silica from solution in the brine, and may also include subsequent separation of the precipitated silica bearing material from the brine. Owens Lake brines and other natural alkali bearing brines are generally found to contain appreciable amounts of silica in solution therein, and it is often advantageous to remove or precipitate either part or substantially all of this silica from the brine.

For example, in the carbonation of such a brine for the purpose of recovering soda therefrom, a portion of this soluble silica is precipitated during the carbonating operation, and the silica so precipitated not only contaminates the soda product, but also occludes other salts from the brine which further contaminate such product. The presence of the gelatinous semi-colloidal silica along with the precipitated soda also prevents thorough washing thereof, either in centrifugals or in filters. In such cases, therefore, it is of considerable advantage to remove from the brine, before carbonation, a portion of the soluble silica content thereof, the proportion of silica so removed being preferably sufficient to substantially eliminate precipitation of silica during the carbonation or other subsequent treatment. The precipitation of silica from brine may also be of advantage precedent to the recovery of borax from such brines. While the present invention is intended particularly for treatment of such brines for the removal of water soluble silica from solution therein, in order to facilitate subsequent treatment of the brine for the removal of an alkali metal salt constituent thereof, and to improve the yield and quality of the product obtained from such subsequent treatment, it is to be understood that it is not restricted to such use and may be employed in any case where it is desired to precipitate part or all of the water soluble silica content of such a brine.

The method of precipitating soluble silica from brine according to the present invention comprises thoroughly mixing with the brine a water soluble aluminum bearing substance and allowing the brine to stand for a sufficient time to cause separation or precipitation of a precipitate containing silica. The resulting precipitate may, if desired, be then separated from the brine in any suitable manner, as for example by settling or filtration.

The amount of aluminum bearing substance added to the brine in the above process may vary considerably, depending upon the percentage of water soluble silica in the brine and upon the percentage to which the silica content is desired to be reduced, but I have found that in general the addition of an amount of aluminum bearing substance containing from 2 to 12 parts by weight of aluminum in combination, for each 100 parts of soluble silica in the brine, will remove a considerable proportion of the silica content of the brine. For example, by means of this treatment the soluble silica in the brine may be reduced from about 0.1% or more to about 0.02% or less. It will be understood, however, that the above proportions of aluminum bearing substance to the weight of silica are given only by way of example and that the essence of the invention resides in the use of any desired proportion of aluminum bearing susbtance, to produce the desired precipitation of silica from the brine. Any suitable water soluble aluminum bearing substance may be employed in the process, such as for example, sodium aluminate or aluminum sulphate. As a matter of fact, the brine itself is alkaline, so that if a compound of aluminum with an acid radical, such as aluminum sulphate or aluminum chloride, is employed, the alkalinity of the brine will cause the same to act in substantially the same manner as though sodium aluminate were initially used as a reagent.

The aluminum bearing substance is preferably introduced into the brine in the form of an aqueous solution of any desired concentration, in order to facilitate the reaction and insure uniform mixing thereof throughout the brine. The brine may be maintained at any desired temperature, for example, at atmospheric temperature or at higher temperatures, as hereinafter explained, during and following the addition of the aluminum bearing substance thereto, and agitation of the brine is preferably employed, particularly during or directly following the addition of such reagent, in order to insure thorough mixing of such reagent throughout the brine. The brine may if desired, be agitated either continuously or from time to time during the formation and precipitation of the silica bearing precipitate. The brine, following addition of the aluminum bearing reagent thereto, may be allowed to stand for any suitable period of time, sufficient to permit practical completion of the resulting precipitation to occur. The time required for this purpose may vary from a few minutes to several days, depending upon the nature of the brine, the amount of silica to be removed, and particularly upon the temperature at which the brine is treated.

I will now describe, as an example, the application of my invention to the removal of a portion of the soluble silica from a batch of soda bearing brine from Owens Lake, California. This brine contained approximately 13.5% sodium carbonate, together with other salts, and also contained 0.104% $SiO_2$ in solution. The specific gravity of the brine was 1.34. A 400 cc. portion of this brine (533 grams), containing 0.555 gram of $SiO_2$ was treated with a saturated sodium aluminate solution containing 0.039 gram of aluminum in combination. The brine was at substantially atmospheric temperature, or about 30° C., and was maintained at substantially atmospheric temperature for about three days. Upon addition of the aluminum bearing reagent, the formation of a precipitate throughout the brine was observed, and the major portion of the precipitation was complete within half an hour. At this temperature, however, a slight further precipitation continued to occur thereafter for a considerable period of time, and in order to obtain the maximum removal of silica the brine was permitted to stand for three days. At the end of that time the precipitate was separated from the brine by filtration, and the filtrate was found to contain only 0.020% $SiO_2$.

The above example serves to illustrate the manner in which my invention may be applied for the removal of silica from brine for any purpose whatever, and illustrates particularly the manner in which it may be carried out, and the advantages resulting therefrom, in the preparation of the brine for subsequent carbonation. Carbonation of a brine such as that used in the above experiment, and containing approximately 0.1% soluble silica, results in the precipitation of a considerable portion of silica along with the sodium bicarbonate or sesquicarbonate formed during the carbonation, while a brine such as that resulting from the above treatment, and containing only about .02% soluble silicia, may be carbonated to remove any suitable proportion of the soda therefrom without causing any appreciable separation of silica during the carbonating operation.

It may be particularly pointed out that, in applying my invention to a brine which is to be subsequently treated for the recovery of an alkali metal salt constituent such as soda or borax therefrom, it is not necessary to entirely remove the silica from brine, but merely to remove the silica to such a point as to facilitate the subsequent treatment or improve the yield or quality of the product of such subsequent treatment. For example, when the brine is to be subsequently carbonated for the recovery of soda products therefrom, the soluble silica content of the brine should be so reduced, by the method above described, that no appreciable further precipitation of silica will be caused during the carbonating operation.

The removal of a considerable portion of the soluble silica also has a further advantage, in case the brine is to be subsequently evaporated by artificial heating, in that it reduces the viscosity and surface tension of the brine, and therefore aids in the evaporation, both by increasing the rate of evaporation and by materially reducing the tendency to foam.

The proportion of aluminum bearing substance used in the above example corresponds to about 7 parts of aluminum in combination, for each 100 parts of $SiO_2$ in the original brine, but as above stated this proportion may be varied within wide limits without departing from the spirit of this invention.

While the above described experiment was carried out at substantially atmospheric temperature, I have found that the required time of treatment, for completion of the precipitation, may be greatly reduced by heating the brine to temperatures above atmospheric temperature, for example to about 60 to 70° C., or to boiling temperature. For example when the brine is heated to the boiling temperature, the silica bearing precipitate forms very rapidly and appears to be sufficiently complete for practical purposes within a few minutes. The invention is not limited, however, as to the temperature at which the brine is treated, and temperatures varying from atmospheric temperature, or even below atmospheric temperature, to the boiling temperature of the brine may be employed.

I claim:

1. The method of purifying Owens Lake brine and similar natural alkali-bearing brines containing less than 1 per cent of silica as an impurity in solution therein, which comprises mixing with the brine a water-soluble aluminum-bearing substance, allowing the brine to stand for a sufficient time to cause formation of a precipitate consisting substantially wholly of alumina and silica, and separating such precipitate from the brine.

2. The method as set forth in claim 1, in which the aluminum-bearing substance is added in an amount containing less than about 12 parts of aluminum in combination for each 100 parts of silica in the brine.

3. The method as set forth in claim 1, in which the aluminum-bearing substance is added in an amount containing from 2 to 12 parts of aluminum in combination for each 100 parts of silica in the brine.

4. The method as set forth in claim 1, and comprising in addition the step of further treating said brine, after separation of said precipitate therefrom, to recover an alkali metal salt constituent therefrom.

WALTER A. KUHNERT.